US008668053B2

(12) United States Patent
Rath

(10) Patent No.: US 8,668,053 B2

(45) Date of Patent: Mar. 11, 2014

(54) GROUND CONVEYOR

(75) Inventor: Olaf Rath, Henstedt-Ulzburg (DE)

(73) Assignee: Jungheinrich Aktiengesellschaft, Hamburg (DE)

(*) Notice: Subject to any disclaimer, the term of this patent is extended or adjusted under 35 U.S.C. 154(b) by 786 days.

(21) Appl. No.: 11/955,245

(22) Filed: Dec. 12, 2007

(65) Prior Publication Data

US 2008/0142307 A1 Jun. 19, 2008

(30) Foreign Application Priority Data

Dec. 16, 2006 (DE) ........................ 10 2006 059 586

(51) Int. Cl.

| | |
|---|---|
| ***B66F 9/06*** | (2006.01) |
| ***B62D 61/12*** | (2006.01) |
| ***B66F 9/14*** | (2006.01) |
| ***B60S 9/04*** | (2006.01) |

(52) U.S. Cl.

USPC ........... 187/232; 414/495; 414/631; 180/209; 180/19.2; 280/755

(58) Field of Classification Search

USPC .......... 187/222, 231, 237, 232; 414/629, 631, 414/495, 785; 280/43.12, 755; 180/13, 180/19.1, 19.2, 209, 906

See application file for complete search history.

(56) References Cited

U.S. PATENT DOCUMENTS

| | | | | |
|---|---|---|---|---|
| 2,498,504 | A * | 2/1950 | Quayle | 280/43.12 |
| 2,564,002 | A * | 8/1951 | Gibson | 180/253 |
| 2,899,093 | A * | 8/1959 | Morrell | 414/639 |
| 3,957,137 | A * | 5/1976 | Vermette | 187/232 |
| 4,131,181 | A * | 12/1978 | Vermette | 187/232 |
| 4,460,064 | A | 7/1984 | Lutz | |
| 4,708,576 | A | 11/1987 | Conley | |
| 4,987,976 | A * | 1/1991 | Daugherty | 187/243 |
| 5,174,415 | A * | 12/1992 | Neagle et al. | 187/234 |
| 5,509,774 | A * | 4/1996 | Yoo | 414/622 |
| 6,343,907 | B1 | 2/2002 | Schalmath | |
| 6,551,050 | B1 * | 4/2003 | Kallevig et al. | 414/607 |
| 6,969,225 | B2 * | 11/2005 | Mensch | 414/685 |
| 2003/0049116 | A1 * | 3/2003 | Henning | 414/667 |
| 2003/0205433 | A1 * | 11/2003 | Hagman | 187/223 |
| 2005/0034929 | A1 * | 2/2005 | West et al. | 187/231 |

FOREIGN PATENT DOCUMENTS

| | | |
|---|---|---|
| DE | 2617130 | 10/1977 |
| DE | 196 15 592 A1 | 10/1997 |
| GB | 2 276 607 A | 10/1994 |

* cited by examiner

*Primary Examiner* — William A Rivera
*Assistant Examiner* — Stefan Kruer
(74) *Attorney, Agent, or Firm* — Vidas, Arrett & Steinkraus

(57) ABSTRACT

Ground conveyor with a drive part with a frame, a load part, which is attached to the frame of the drive part and the height of which is operated on the, if applicable, one load pickup means that can be actuated by a lifting device, furthermore with parallelly distanced wheel arms, which are attached with their rear ends on the frame or the load part and each support a load-bearing wheel with means for changing the distance of the wheel arms (wheel-arm width), wherein a bearing arm is fastened on the rear end of the wheel arms, which extends almost perpendicular to the wheel arm and is received fittingly and moveably in at least one bearing opening of the frame or the load part and fixing means are provided on the frame or load part, with which the axial and pivot position of the bearing arms can be releasably retained.

10 Claims, 2 Drawing Sheets

GROUND CONVEYOR

CROSS-REFERENCE TO RELATED APPLICATIONS

Not applicable.

STATEMENT REGARDING FEDERALLY SPONSORED RESEARCH

Not applicable.

BACKGROUND OF THE INVENTION

Different types of ground conveyors have so-called wheel arms, which are attached to the frame of the drive part or to the lifting frame of the load part, and support load-bearing wheels on the front end. In some cases, the load arms themselves serve as load pickup means and thus perform only a so-called free lift in order to lift a pallet from the ground so that it can be transported. In the case of ground conveyors with a load fork, which is operated on a lifting frame and is actuated by means of a lifting device, the arms of the load fork are aligned with the wheel arms and overlap them in the lower position. However, there are also applications, in which the so-called wheel arm width extends beyond the fork width of the load fork or in which the wheel arm width should also be made to be changeable. In this case, the wheel arms cannot be permanently attached to the frame or the load part, for example through welding, but rather fastening means must be provided, which enable the removal of the wheel arms or also an adjustment relative to the frame or load part in order to change the wheel arm width.

The mounting of wheel arms in the case of changeable wheel arm widths is problematic. Through play and tolerances as well as bending of the wheel arms and different torsion of the arms, via which the wheel arms are attached to the flame or load part, it is difficult to ensure the ground clearance under all circumstances, in particular in the case of four-wheeled vehicles. The greater the distance between the wheel arms and the attachment location, the greater the bending and torsion. The ground clearance can thus continue to be decreased until the vehicle sits on the ground.

It has become known in the case of a push mast stacker or a so-called reach truck to weld the wheel arms with an arm piece with different lengths depending on the desired wheel arm width and to provide the arm piece with a plate flange, which is screwed on the frame or on the lifting frame with a counter flange. The wheel arm width can only be set during the assembly of the ground conveyor. Later modification is difficult.

The object of the invention is to create a ground conveyor that enables a simple and uncomplicated connection of the wheel arms with a simple and effective readjustment option in the case of a change in the wheel arm width.

BRIEF SUMMARY OF THE INVENTION

In the case of the invention, the rear end of the wheel arms is fastened to a bearing arm, which extends almost perpendicular to the wheel arm and which is received fittingly and moveably in at least one bearing opening of the frame or the bearing component. Fixing means, with which the axial and pivot positions of the bearing arms can be releasably retained, are provided on the frame and/or in the load part.

If only one bearing opening is provided, then it should be equipped with sufficient axial length in order to ensure sufficient support of the bearing arm. The arrangement preferably has at least two axially distanced bearing openings, through which the wheel arms are supported in a stable manner.

The wheel arms can be moved together with the bearing arm in the bearing opening, wherein the fixing means ensure that the bearing arms are immobilized in both the axial and the pivot positions. If the bearing arm is not round or polygonal in cross-section, for example rectangular, the pivot position is immobilized in this manner. However, it can also no longer be changed in this case. In this case, we just need to be concerned about the axial securing of the received position.

Should the bearing arm be able to be immobilized in different pivot positions, it should either be provided with a circular cross-section and received in a complementary bearing opening, or if the bearing arm is not round or has multiple edges in cross-section, then it should be surrounded by a component with the bearing opening, which is in turn seated in the frame or in the load part in a rotatable but restricted manner. In this case, either this bearing component or the bearing arm can then be immobilized through suitable fixing means in the direction of rotation.

In accordance with one embodiment of the invention, the fixing of the bearing arms in the axial and/or pivot position can take place with the help of a clamping device. Alternatively, fixing is also possible with the help of screw pins (shown schematically in FIG. 3 at 70, with the other screw pin hidden on the other side).

If the cross-section of the bearing arms is circular, an adjustment device, which engages eccentrically to the axis on the bearing arms and thereby permits or causes a restricted rotation of the bearing arms, can be provided in accordance with another embodiment of the invention. For this purpose, the bearing arm can be provided intermittently or entirely eccentrically with an axially parallel running surface, and an adjustment screw works with its end against the end of this surface in order to enable a rotation of the bearing arm.

The already mentioned clamping device, which simultaneously forms a second bearing opening, can be formed by two shells, which are tensioned against each other by means of two clamping screws, in order to immobilize the bearing arm in the axial and rotational directions.

BRIEF DESCRIPTION OF THE SEVERAL VIEWS OF THE DRAWINGS

One exemplary embodiment of the invention is explained below in greater detail using drawings.

DETAILED DESCRIPTION OF THE INVENTION

Figure 1:
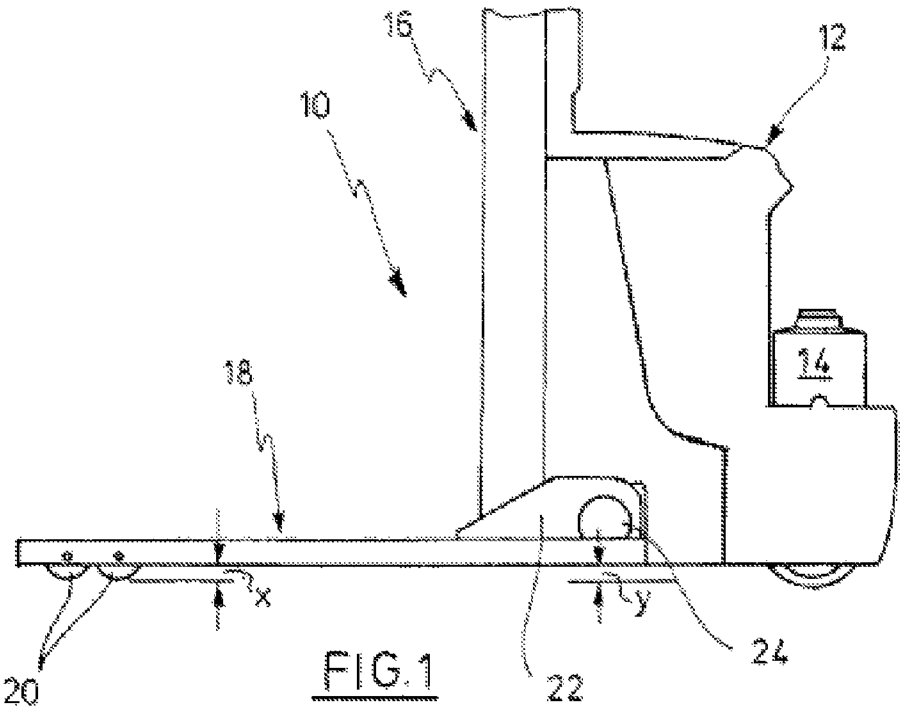
FIG. 1 shows a side view of a ground conveyor according to the invention.

While this invention may be embodied in many different forms, there are described in detail herein a specific preferred embodiment of the invention. This description is an exemplification of the principles of the invention and is not intended to limit the invention to the particular embodiment illustrated FIG. 1 shows a side view of a drawbar-driven lifting truck 10, wherein however the drawbar is not shown. The lifting truck 10 consists of a drive part 12 with a drive motor 14 and a lifting frame 16, on which a load fork (not shown) is operated in a height-adjustable manner. The adjustment takes place with the help of a lifting and lowering drive (also not shown).

A pair of wheel aims, one of which is labeled with the number 18, is attached to the frame on opposite-lying sides of the drive part 12. Load-bearing wheels 20 are mounted on the free end of the wheel arms.

The wheel arms 18 have a bearing component 22, which receives a bearing arm 24 in an opening, on the rear end on the top side. The bearing arm 24 is permanently connected with the bearing component 22 through suitable means.

Figure 2:
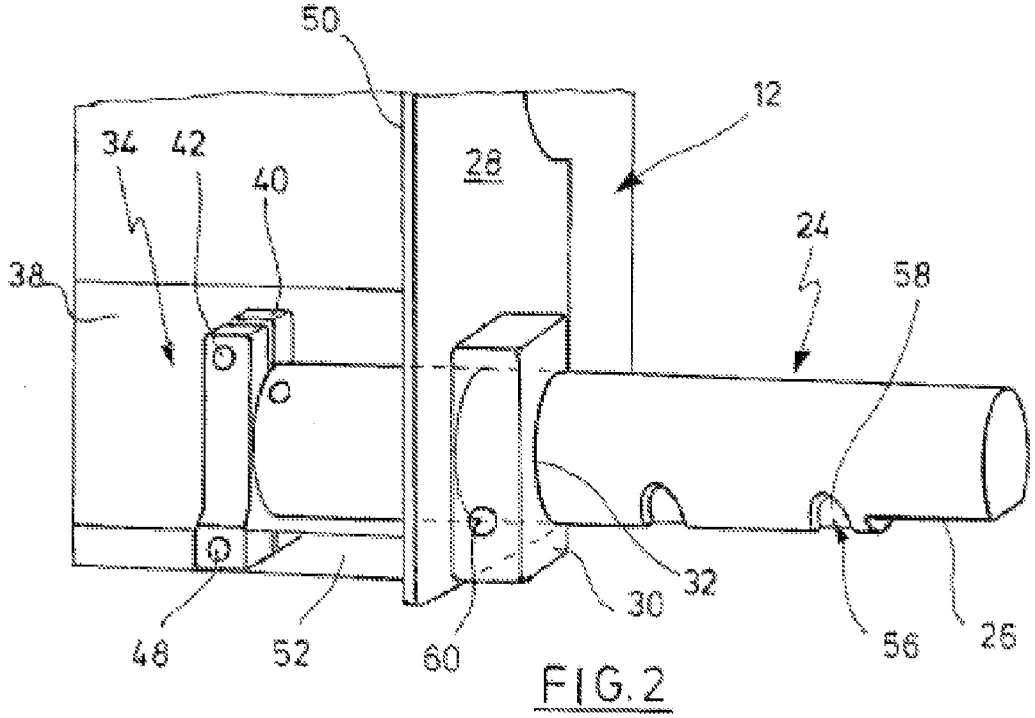
FIG. 2 shows a perspective view of one detail of the ground conveyor according to FIG. 1.
Figure 3:
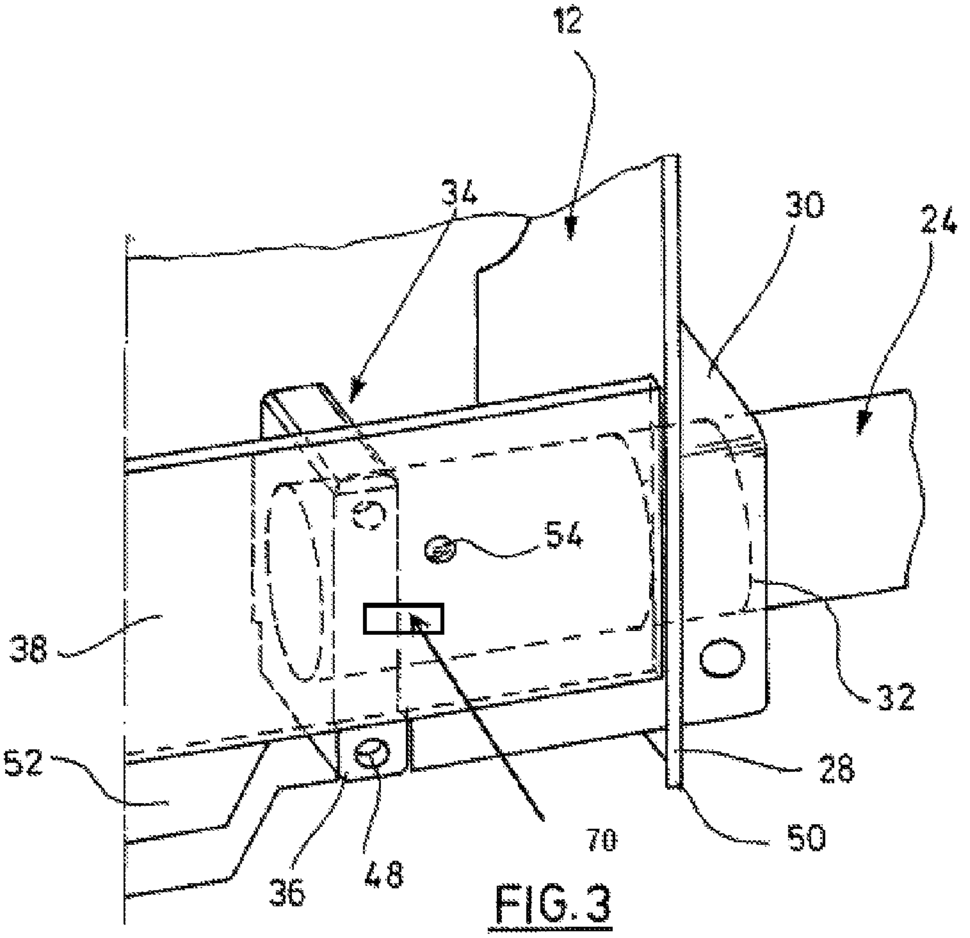
FIG. 3 shows a view similar to FIG. 2 but enlarged with respect to FIG. 1.

In FIGS. 2 and 3, the bearing arm 24 is shown without a wheel arm. One can see that the bearing arm 24 has a mainly circular cross-section, but is flattened on the free end at 26 for the purpose of being received in a non-rotatable manner in bearing component 22 (FIG. 1). A bearing block 30 is arranged with a cylindrical opening 32 on a vertical sheet 28 of the frame of the only suggestively shown drive part of the ground conveyor according to FIG. 1. The bearing block 30 is for example welded onto the sheet 28. The bearing arm 24 extends through the opening 32 and a concentric opening in the sheet 28 to a clamping device 34. The clamping device consists of a first jaw 36, which is permanently fastened with a sheet 38 of the frame of the drive part 12 and of a second jaw 40. The jaws 36, 40 are tensioned against each other by two clamping screws, which are not shown here. Openings are provided for this in the clamping jaws 36, 40, as indicated by 42 or 48. The clamping jaws 36, 40 have semi-circular shells, with which they encompass the bearing arm 24 on opposite-lying sides.

A sheet 52, which is indicated in a transparent manner in FIG. 2 for illustrational purposes, in contrast to FIG. 3, is attached to the front edge 50 of the sheet 28. The sheet 38 has a threaded bore hole 54, to which the lifting frame 16 according to FIG. 1 is attached.

Figure 4:
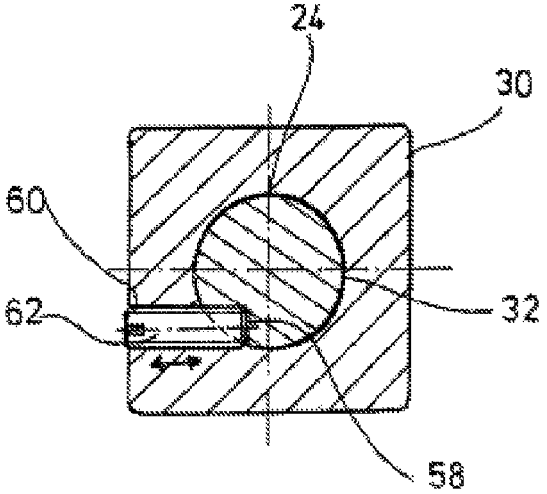
FIG. 4 shows a section through a bearing block of the arrangement according to FIGS. 2 and 3.

As can be seen in particular in FIG. 2, the bearing arm 24 has several recesses 56, which are arranged eccentrically to the longitudinal axis of the bearing arm 24 and are spaced. The bottom 58 of the recesses 56 is almost vertical. A threaded bore hole 60 is provided in the bearing block 30, which, as shown in FIG. 4, receives a set screw 62. The set screw 62 is arranged such that it can engage with the recess 56, in particular with the bottom 58, as shown in FIG. 4. By changing the position of the set screw 62, the pivot position of the bearing aim 24 also changes in the case of corresponding torque. It is created through the weight of the drive part and the load part 12, 16 on the wheel arms 18, whereby a corresponding torque is applied to the bearing arms 24. Even if the bearing arms 24 are fastened by the clamping device 34 in a non-rotatable manner, the bending of the bearing arms 24 and its torsion can lead to the fact that the distance from the wheel arms 18 to the subsurface may be too small. This distance is indicated with y in FIG. 1. The distance from the loading-bearing wheels 20 to the subsurface is indicated with x. The distances x and y are preferably the same size. However, if the distance y is too small, it is possible to counteract the described deformations of the parts by turning the screw 62 and making the potentially too small distance larger again.

It is understood that this setting of the pivot position of the bearing arms 24 takes place when the clamping jaws 36, 40 are released. When the desired adjustment has been made, the clamping jaws are tightened again in order to immobilize the pivot position of the bearing arms 24.

It can be seen that the wheel arm width can be easily changed using the described means and it is also possible to prevent potential reductions in the ground clearance with correspondingly large wheel arm widths through the described adjustment of the bearing arms 24.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A ground conveyor with a drive part with a frame, a load part, which is attached to the frame of the drive part, furthermore with parallel distanced wheel arms, which are attached with their rear ends on the frame or the load part and each supports a load-bearing wheel, with means for changing a distance between the wheel arms, the distance being a wheel-arm width, characterized in that a bearing arm (24) is fastened on the rear end of each of the wheel arms (18), which extends almost perpendicularly to the wheel arm (18) and is received fittingly and moveably in at least one bearing opening (32) of the frame or the load part (16)), wherein the bearing arms (24) are seated in the bearing opening (32) in a pivotable manner, and wherein the bearing arms (24) are releasably retained on the frame or load part (16).

2. The ground conveyor of claim 1 wherein the bearing arms (24) can be immobilized on the frame or the load part (16) in different pivot and axial positions.

3. Ground conveyor according to claim 2, characterized in that the bearing arms (24) are seated in the bearing opening (32) in a pivotable manner when the fixing means are loosened, an adjustment device is provided which engages eccentrically on the bearing arms (24) and causes or permits a restricted rotation of the bearing arms (24) when actuated.

4. Ground conveyor according to claim 3, characterized in that the adjustment device is assigned to a bearing opening (32).

5. Ground conveyor according to claim 4, characterized in that the bearing arms (24) have intermittent or an entirely eccentric, axially parallel running surface, with which an end of an adjustment screw (62) works in the frame or in the load part.

6. Ground conveyor according to claim 1, characterized in that immobilization of the bearing arms (24) takes place in the axial and/or pivot position by means of a clamping device (34).

7. Ground conveyor according to claim 1, characterized in that immobilization of the bearing arms in their pivot positions takes place by means of circumferential toothing on the bearing arms and a complementary bearing opening.

8. Ground conveyor according to claim 1, characterized in that a cross-section of the bearing arms is rectangular or otherwise polygonal.

9. Ground conveyor according to claim 1, characterized in that a cross-section of the bearing arms (24) is circular.

10. Ground conveyor with a drive part with a frame, a load part, which is attached to the frame of the drive part, furthermore with parallel distanced wheel arms, which are attached with their rear ends on the frame or the load part and each supports a load-bearing wheel, with means for changing a distance between the wheel arms, the distance being a wheel-arm width, characterized in that a bearing arm (24) is fastened on the rear end of the wheel arms (18), which extends almost perpendicularly to the wheel arm (18) and is received fittingly and moveably in at least one bearing opening (32) of the frame or the load part (16) and fixing means are provided on the frame or load part (16), with which an axial and pivot position of the bearing arms (24) can be releasably retained;

further characterized in that the fixing means (34) has two shells (36, 40), a first of which is fastened on the frame or load means and a second of which (40) can be fastened on the first shell by means of clamping screws.

* * * * *